United States Patent [19]

Croxon

[11] 3,800,290

[45] Mar. 26, 1974

[54] DATA HANDLING APPARATUS

[76] Inventor: Allen H. Croxon, 24 Ousden Close, Cheshunt, Hertfordshire, England

[22] Filed: Aug. 17, 1972

[21] Appl. No.: 281,396

[30] Foreign Application Priority Data

Aug. 17, 1971 Great Britain .................... 38432/71

[52] U.S. Cl. ............................ 340/172.5, 179/15 A

[51] Int. Cl. ............................................ G06f 3/00

[58] Field of Search ................................ 340/172.5

[56] References Cited

UNITED STATES PATENTS

| | | | |
|---|---|---|---|
| 3,654,617 | 4/1972 | Irwin | 340/172.5 |
| 3,665,404 | 5/1972 | Werner | 340/172.5 |
| 3,688,273 | 8/1972 | Narang | 340/172.5 |
| 3,688,274 | 8/1972 | Cormier et al. | 340/172.5 |
| 3,641,505 | 2/1972 | Artz et al. | 340/172.5 |

*Primary Examiner*—Gareth D. Shaw
*Attorney, Agent, or Firm*—Mason, Mason & Albright

[57] ABSTRACT

Data handling apparatus has input and output means connected to input and output signal lines, the input and output means comprising switching means enabling any one of the input lines and any one of the output lines to be selected. Data processing means is connected between the input and output means and enables any one of a predetermined set of operations to be performed on data received on any one or more of the input lines, the result being outputted on any one or more of the output lines. The data processing means operates under control of a stored program.

6 Claims, 1 Drawing Figure

PATENTED MAR 26 1974 3,800,290
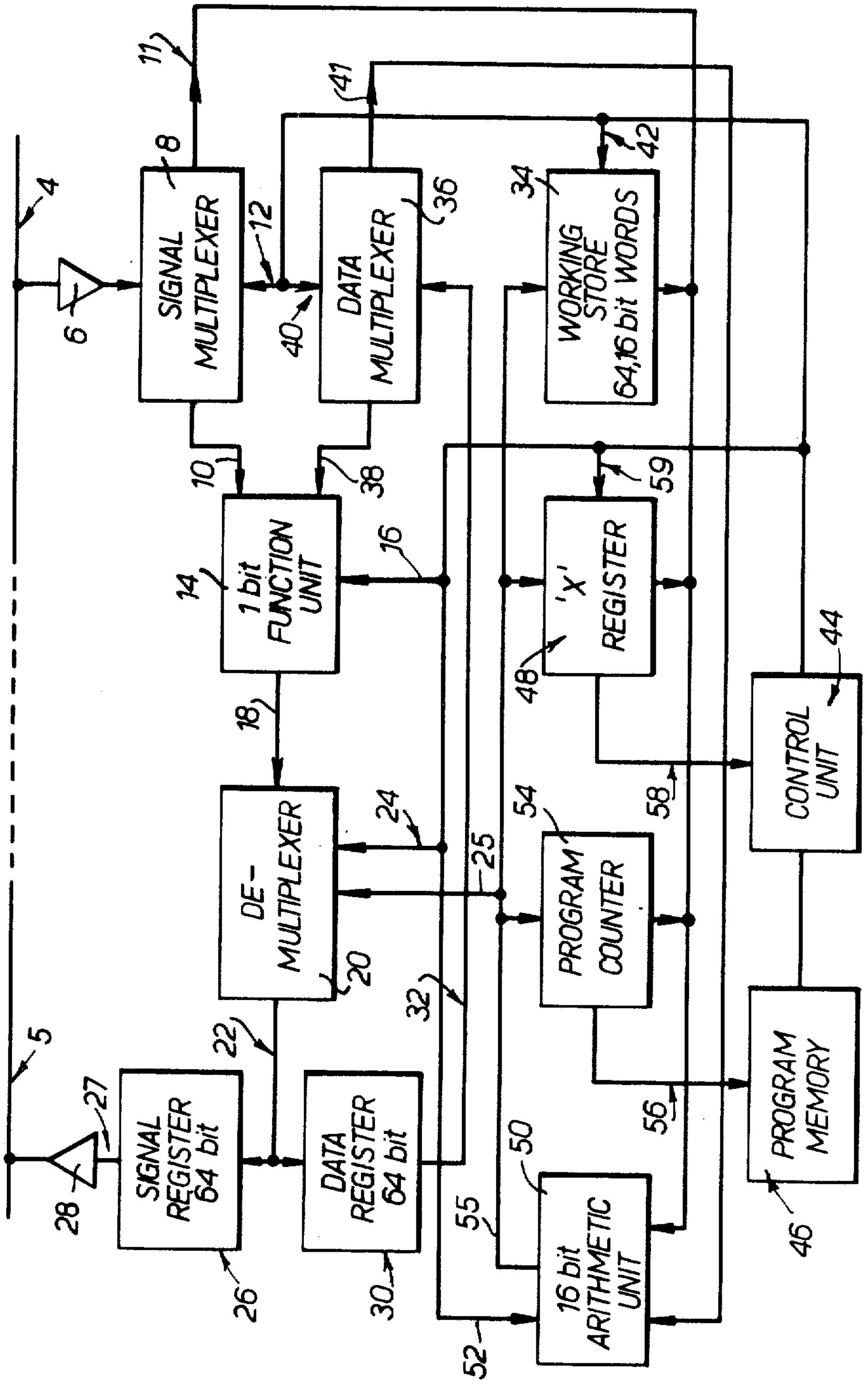

DATA HANDLING APPARATUS

The invention relates to electronic data handling apparatus.

According to the invention, there is provided electronic data processing apparatus having input and output means for connection to signal lines, which means respectively comprise switching means enabling selection of any one of the signal lines by the input means and simultaneous selection of any one of the signal lines by the output means, and data processing means connected between the input and output means for performing a predetermined operation on data received via the signal line selected by the input means, the result of the said operation being outputted via the output means.

Electronic data processing apparatus embodying the invention will now be described, by way of example only, with reference to the accompanying drawing which is a block diagram of the apparatus.

The apparatus to be described is particularly, though not exclusively, useful as an interface device between two other items of data processing equipment.

The apparatus comprises an input channel 4 and an output channel 5 containing a number of signal lines (64, for example). These lines are connected through level changing amplifiers shown generically at 6 to a signal multiplexer 8 which has two output channels 10, 11, one 10 comprising a single line 10 to which it can connect any one of the 64 input lines, and the other 11 comprising 16 lines to which it can respectively connect the lines of any one of four sequential groups of the 64 input lines; in each case, the connections are made under control of a control signal received on a control line 12.

The line 10 is connected to data processing means in the form of a function unit 14 which can perform any one of a number of different functions on the received data, as determined by a control signal received on a line 16.

The function unit 14 has an output line 18 which is connected to a de-multiplexer 20. The latter has an output channel 22 containing 64 output lines, and connects the input line 18 to any one of the 64 lines in the channel 22 under control of a control signal received on a control line 24. The de-multiplexer 20 has an additional input channel 25 containing 16 lines which can be respectively connected to the lines of any of four sequential groups of the 64 output lines in channel 22.

The channel 22 feeds a signal register 26 having a respective stage for each of the 64 lines, each stage being connected to the appropriate line in the channel 5 via a channel 27 and respective level changing amplifiers shown generically at 28.

In addition, the channel 22 is connected to a data register 30, which is of the same form as the signal register 26. The stages of the register 30 are connected by means of a 64 line channel 32 to a signal multiplexer 36 which can connect any one of the 64 lines of the channel 32 to its single output line 38, under control of a control signal received on a control line 40. The line 38 is connected to a second input of the function unit 14. In addition, the multiplexer 36 has an output channel 41 containing 16 lines which can be respectively connected to the lines of any one of four sequential groups of the 64 lines of channel 32, also under control of the signal on line 40.

The two 16 line channels 11 and 41 from signal multiplexer 8 and data multiplexer 36 respectively, are connected to a 16 bit arithmetic unit 50 which can perform any one of a number of 16 bit functions on received data as determined by a control signal received on a line 52. The output of the arithmetic unit 50 is connected to the de-multiplexer 20, a program counter 54, an X register 48 and the working store 34, by means of a channel 55 and channel 25. The outputs from program counter 54, X register 48 and working store 34 are connected by means of the channel 11 to the 16 bit arithmetic unit 50.

The control signals on the control lines 12, 16, 24, 40, 42 and 52 are produced by a control unit 44. This operates under control of a stored program which is stored in a program memory 46. The program counter 54 is connected to control the program sequence by means of a line 56. The control unit 44 receives signals from the X register 48 via a channel 58 and can send to the register 48 via a channel 59.

In operation, the apparatus provides highly flexible digital signal processing facilities and may be programmed to perform, sequentially, any form of logical and arithmetic operation between signal lines and registers. Some examples of the many different operating modes will now be described.

The apparatus may, for example, be arranged to transfer data on one of the 64 lines of the channel 4 to any one of the 64 lines of the channel 5. In such a mode, the control unit 44 would, via the control line 12, cause the signal multiplexer 8 to connect its output line 10 to the selected one of the lines of the channel 4 from which the data is to be transferred. The data on this line would then be fed serially through the function unit 14 to the de-multiplexer 20 which would be set, via the control line 24, so as to connect its input line 18 to the particular one of the 64 lines in its channel 22 corresponding to the line in the channel 5 on which the data is to be outputted. Thus, the serially fed data would pass on to the desired output line via the appropriate stage of the register 26 and the appropriate level changing amplifier.

In another example, the apparatus can be arranged to perform an arithmetical operation (addition, for example) on the data received on two of the lines of the channel 4. In such a mode, the data on one of the lines would be selected by the multiplexer 8, by means of an appropriate signal on the control line 12, and fed through the function unit 14 and the de-multiplexer 20. Instead of being fed out to the channel 5 via the signal register 26, however, the data would be fed into the data register 30. Thence it would pass, via the channel 32 and the multiplexer 36, under control of a signal on the line 40, to the function unit 14 by means of the line 38. While the data is being transferred back to the function unit 14 in this way, the multiplexer 8 would be switched, by means of the control line 12, so as to feed the second item of data, from its particular line, to the function unit 14 on the line 10, and the function unit 14 would be set, by means of its control line 16, to perform addition (or any other desired arithmetical function) on the two data items presented to it. Thereafter, the result of the arithmetical process would be fed on to a particular one of the lines in the channel 5 via the de-multiplexer 20, the appropriate stage of the signal register 26, and the appropriate one of the level changing amplifiers 28.

In a further possible mode of operation, the X store 48 can be used to convert data received in parallel on a group of input lines in the channel 4 into serial form which is then outputted on a single line in the channel 5. In such a case, a number (corresponding to the number of lines on which the parallel data is received) is stored in the X register 48. In response to this, the control unit 44 causes the signal multiplexer 8 to select one of the group of input lines and the data received thereon is fed via the lines 10 and 18 and the function unit 14 to the de-multiplexer 20. The latter is controlled, by means of the line 24, to feed the data out on to the particular one of the lines 22 corresponding to the desired output line in the channel 5. The X register 48 is then decremented by one, causing the signal multiplexer 8 to select the next one of the group of input lines and the data received thereon is then fed out, via the de-multiplexer 20, on the same one of the output lines. This process continues until the X register has been decremented down to one.

In another possible mode of operation, the X register 48 can be used to cause the apparatus to convert serially received data into parallel form. In a particular example, let it be assumed that eight items of data serially presented on a particular one of the input lines in the channel 4 are to be outputted in parallel on eight lines in the channel 5. In such a case, a number 8 is stored in the X register 48, and the signal multiplexer 8 is set to select the particular input line from the channel 4, by means of an appropriate control signal on the line 12. At the same time, by means of a control signal on the line 24, the de-multiplexer 20 connects its line 18 to that one of the lines in the channel 22 corresponding to the first of the eight desired output lines in the channel 5. The first serially received item of data on the selected input line thus passes through the multiplexer 8, the function unit 14, and the de-multiplexer 20 into the particular stage of the register 30 corresponding to the selected line in the channel 22.

The X register is then automatically decremented by one, and this causes the control unit 44 to set the demultiplexer 20 so as to connect its line 18 to the particular line in the channel 22 corresponding to the next data output line. The second bit of serially presented data on the selected one of the input lines in the channel 5 thus passes through the signal multiplexer 8, the function unit 14, and the de-multiplexer 20 into a different stage of the data register 30. Once more, the X register 48 is then decremented by one so as to cause the de-multiplexer 20 to select the particular one of its lines 22 corresponding to the third output line in the channel 5, and to feed the third serially presented bit into a further stage of the register 30. This process repeats again until the stored number in the X register 48 has been decremented down to one, at which time it will be seen that the eight serially presented data bits are stored in the register 30. By means of appropriate control signals, this stored data is then transferred, via channel 32, multiplexer 36, function unit 14 and demultiplexer 20 to corresponding stages in the signal register 26 and outputted in parallel on eight lines in the channel 5.

The apparatus can be used to assemble data into a word which is then stored in the working store 34. In such a case, a number corresponding to the number of bits in the data word is placed in the X register 48, and the apparatus then operates in the manner explained above to feed items of serially received data from one of the input lines 4 into a corresponding number of locations in the data register 30. The control unit 44 then causes the store 34 to read out the data held in the register 30 and to store it in the appropriate locations in the working store 34. It will be appreciated that this process can be used to assemble the data received on any number of input lines in the channel 4 (and in serial or parallel form) into data words. The data words can then be fed out serially or in parallel onto the channel 5 via the signal register 26.

Other registers, besides the X register 48, may be provided for performing other control functions — such as storing carries temporarily when the function unit 14 is performing arithmetic operations.

The apparatus may also be used to receive and transmit data in a 16 bit word or block form. A 16 bit word may be read from the signal lines 4 via signal multiplexer 8 and placed as an input to the 16 bit arithmetic unit 50 via lines 11. The other 16 bit input to the 16 bit arithmetic unit 50 may be selected from data registers 30 via channel 32, multiplexer 36 and channel 41. The resultant output of the 16 bit arithmetic unit 50 is then fed via channel 55 to program counter 54 (to cause a transfer of control action), to the X register 48, (to give an indirect address of possible further data to follow), to the working store 34 (to be stored for later use), to the data registers 30 (for use in later functions or arithmetic operations) via de-multiplexer 20, and to the signal registers 26 (for outputting on lines 5).

It will be appreciated that the signal lines in the channel 4 and 5 are bi-directional when connected together, and there may be more or less than the 64 lines specified above, appropriate alteration being made to the other components of the apparatus as necessary.

The apparatus may be provided with INTERRUPT facilities. For example, there may be four INTERRUPT lines having predetermined priorities, each INTERRUPT overriding an existing INTERRUPT of lower priority.

What I claim is:

1. Electronic data processing apparatus, comprising a first plurality of input and output signal lines, input and output means connected to the signal lines, said input means comprising signal multiplexing means having an output line and selectively operative to connect any one of the signal lines to the said output line, said output means including demultiplexing means having one input line and an output channel containing a said first plurality of output lines and selectively operative to connect its input line to any one of the lines in its output channel, and means for connecting each line in the said output channel to a respective one of the output signal lines, data transfer means connected to the output channel of said demultiplexing means and including data multiplexing means which has a single output line and which is selectively operative to connect to its output line any one of the lines in the output channel of the demultiplexing means, data processing means connected to receive data inputs on the output lines of the signal multiplexing means and the data multiplexing means and having an output connected to said input line of the demultiplexing means, and operative to perform any one of a number of predetermined operations on data received on at least one of its said inputs, an arithmetic unit having two input channels each containing a number of input lines which is a submultiple of the number of lines in the said first plurality, and an output channel, means connecting one of the input channels of the arithmetic unit to the signal multiplexing means to be fed by selective ones of the input signal lines, means connecting the other one of the input channels of the arithmetic unit to the data multiplexing means to be fed by selected ones of the lines in the output channel of the demultiplexing means, means connecting the output channel of the arithmetic unit to the demultiplexing means for connection thereby to selected ones of the output signal lines, and programming means for controlling the operation of the apparatus and connected to the signal mutliplexing means, the data multiplexing means, the demultiplexing means, the data processing means, and the arithmetic unit.

2. Apparatus according to claim 1, including a data register having a plurality of stages each having an output connected to a respective one of the output signal lines, the register being connected to be fed by the output channel of the demultiplexing means.

3. Apparatus according to claim 1, in which the data transfer means includes a data register having a plurality of stages each connected to a respective one of the lines in the output channel of the demultiplexing means and connected to feed the data multiplexing means.

4. Apparatus according to claim 1, including a control register for storing a serial number corresponding to a group of the said input signal lines on which data is to be received in parallel, means connecting the control register to the signal multiplexing means whereby the latter selects the first input signal line of the said group, means responsive to the control register to cause the demultiplexing means to feed the data on the said first one of the group of input signal lines onto a particular one of the output signal lines, and means responsive to the transfer of the data from the said first one of the input signal lines in the said group to the said one output signal line to decrement the control register by 1, whereby the process is repeated for the second and subsequent ones of the input signal lines in the said group, so as to convert the parallel-received data into serial form on the said one output signal line.

5. Apparatus according to claim 3, including a control register for storing a number corresponding to the number of output signal lines in a predetermined group thereof on which data is to be output in parallel, means responsive to the number in the control register to cause the demultiplexing means to select the stage of the data register corresponding to the first one of a group of lines in the output channel of the de-multiplexing means corresponding to the said group of output signal lines, means operative to cause the signal multiplexing means to select a particular one of the input signal lines on which data is received in serial form whereby the signal multiplexing means feeds the first bit of data through the data processing means and thence into the selected stage of the data register and onto the first one of the group of output signal lines, and means responsive to such feeding of the first bit of data to decrement the control register by 1 whereby the demultiplexing means selects the stage in the data register corresponding to the next one in the said group of lines in the output channel of the demultiplexing means and the process is repeated for the second and subsequent ones of the output lines in the said group, so as to convert the serial received data into parallel output form.

6. Apparatus according to claim 1, including a data store having a greater number of storage locations than the number of signal lines, and means connecting the data store for receiving and assembling data received on the input signal lines in bit form and to be output on the output signal lines in word form.

* * * * *